United States Patent
Mednik et al.

(10) Patent No.: US 6,781,351 B2
(45) Date of Patent: Aug. 24, 2004

(54) AC/DC CASCADED POWER CONVERTERS HAVING HIGH DC CONVERSION RATIO AND IMPROVED AC LINE HARMONICS

(75) Inventors: Alexander Mednik, Campbell, CA (US); David Chalmers Schie, Cupertino, CA (US); Wei Gu, San Jose, CA (US)

(73) Assignee: Supertex Inc., San Jose, CA (US)

( * ) Notice: Subject to any disclaimer, the term of this patent is extended or adjusted under 35 U.S.C. 154(b) by 41 days.

(21) Appl. No.: 10/283,395

(22) Filed: Oct. 28, 2002

(65) Prior Publication Data

US 2004/0079953 A1 Apr. 29, 2004

Related U.S. Application Data

(60) Provisional application No. 60/404,795, filed on Aug. 17, 2002.

(51) Int. Cl.[7] .................................................. G05F 1/10
(52) U.S. Cl. ....................................................... 323/222
(58) Field of Search ................................. 323/222, 232, 323/233; 363/52, 54, 81, 82, 84, 89, 125, 126, 127

(56) References Cited

U.S. PATENT DOCUMENTS

| | | | | |
|---|---|---|---|---|
| 5,757,166 A | * | 5/1998 | Sodhi | 323/222 |
| 5,914,587 A | * | 6/1999 | Liu | 323/222 |
| 5,923,153 A | * | 7/1999 | Liu | 323/222 |
| 6,188,207 B1 | * | 2/2001 | Kitajima | 323/222 |
| 6,690,143 B2 | * | 2/2004 | Lin et al. | 323/222 |

* cited by examiner

*Primary Examiner*—Matthew V. Nguyen
(74) *Attorney, Agent, or Firm*—Andrew M. Harris; Jeffrey D. Moy; Weiss, Moy & Harris, PC.

(57) ABSTRACT

AC/DC cascaded power converters having high DC conversion ratio and improved AC line harmonics provide low input harmonic currents, high power factor and efficient operation for low voltage DC outputs when coupled directly to a source of unfiltered rectified AC voltage. The power converter incorporates an intermediate storage element that provides most or all of the energy storage capacitance within the power converter and a blocking device that enables continuous energy transfer from AC line to output to achieve unity power factor and regulated output while maintaining low AC input current ripple.

20 Claims, 3 Drawing Sheets

AC/DC CASCADED POWER CONVERTERS HAVING HIGH DC CONVERSION RATIO AND IMPROVED AC LINE HARMONICS

CROSS-REFERENCE TO RELATED APPLICATION

This application is related to U.S. provisional application 60/404,795 filed Aug. 17, 2002 and from which it claims benefits under 35 U.S.C. §119(e).

BACKGROUND OF THE INVENTION

1. Field of the Invention

The present invention relates generally to power supplies, and more specifically to multi-stage AC/DC power supplies and methods for directly converting rectified alternating current (AC) input to produce a low voltage direct current (DC) output with low input current harmonic distortion.

2. Background of the Invention

Switching power converters are typically used in a wide variety of applications. Off-line AC/DC converter applications (for operation from an AC power line source) are a common example. Power factor correction is often incorporated in such power converters and typically takes one of two forms: a separate power factor correction stage at the input of the power converter or a power converter designed with power factor correction as part of the overall control function of the power converter.

Recently, the development of high-efficiency semiconductor light sources has generated a demand for low power high-efficiency off-line converters. Use of high-efficiency semiconductor light sources in traffic control, industrial and household applications is on the rise. Compatible and efficient power converters for supplying power from an AC line to a low voltage output at a relatively low power level are therefore a necessity. It is further necessary in some semiconductor light source applications to provide power factor correction (PFC) and a low level of AC input harmonic current, even in low power applications. In some applications, since a multitude of power supplies for the semiconductor light sources operate in parallel off of an AC line power source, power factor correction and reduction of AC line harmonic currents are a necessity to provide high efficiency and a low level of line interference.

Two-stage converters combining a power-factor correction (PFC) stage with a down converter stage are typically used when high efficiency and low input current harmonics are required. However, typical two-stage converters are costly for low power applications. Single-stage power factor corrected power supplies have been proposed, but for low voltage DC outputs they are generally restricted to transformer-coupled applications due to the step-up characteristic of a boost input stage that provides the PFC functionality. An attempt to operate these power converters as direct-coupled converters (as opposed to transformer coupled converters) would require the second stage down converter to operate at a very low duty cycle in order to produce a low output voltage, leading to inefficient operation.

Quadratic power converters for providing low voltage outputs from a wide range of input voltage were proposed by D. Maksimovic and S. Cuk in the article "Switching Converter with Wide DC Conversion Range", May 1989 proceedings of the HFPC and also in "Switching Converters with Wide DC Conversion Range" published in the Institute of Electrical and Electronic Engineer's (IEEE) Transactions on Power Electronics on January 1991. The topologies use a single switch to control cascaded buck and buck-boost stages. However, PFC functionality cannot be provided using these topologies. In order to provide good power factor performance, the input buck-boost stage must operate in the discontinuous conduction mode (DCM) with a nearly fixed duty ratio. Operation in continuous conduction mode defeats the PFC operation, as the input current is no longer a function of the duty ratio. Also, a low frequency filter (energy storage device) must be incorporated in the power supply topology to provide regulated DC output throughout the AC line cycle.

Therefore, it would be desirable to provide low output voltage cascaded converters that may be directly coupled to an AC line without a need for a step-down transformer while maintaining power factor correction and a low level of input current harmonics.

SUMMARY OF THE INVENTION

The above objective of providing low output voltage cascaded converters that may be direct-coupled to the AC line, while maintaining power factor correction and a low level of input current harmonics is achieved in a method and apparatus. The apparatus includes a rectifier for rectifying an AC voltage input to produce a rectified DC output, a first converter stage for correcting input power factor and converting the rectified power output to an intermediate DC voltage lower than a maximum level of the rectified DC output, and a second converter stage for converting the intermediate DC voltage to an output DC voltage. The first converter stage includes an input circuit comprising a first inductor series coupled with a first diode, a switch for coupling in series with a first diode. The series connected circuit is connected to said rectifier so that the first converter section is prevented from conducting energy into the rectifier when the voltage at the rectifier output falls below a threshold.

The foregoing and other objectives, features, and advantages of the invention will be apparent from the following, more particular, description of the preferred embodiments of the invention, as illustrated in the accompanying drawings.

DETAILED DESCRIPTION OF THE PREFERRED EMBODIMENTS

Figure 1:
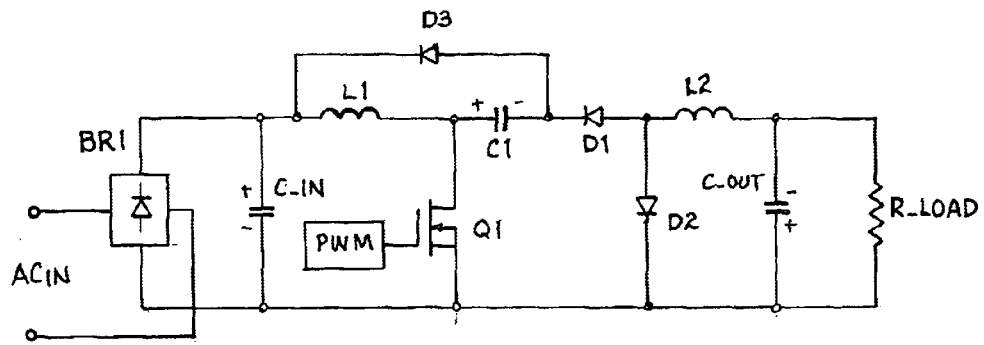
FIG. 1 is a schematic diagram depicting a prior art power supply circuit.

Referring to FIG. 1, a prior art power supply is depicted. A bridge BR1 full-wave rectifies an AC line input to produce an input power source. Filter capacitor C_IN filters the voltage at the output of bridge BR1 to produce a DC input voltage having substantially eliminated AC line components. The input DC voltage across capacitor C_IN is applied to a first converter (buck-boost) stage that includes an inductor L1, a capacitor C1, a diode D1 and a switch (transistor) Q1. When switch Q1 is activated by a pulse width modulator PWM, inductor L1 charges as current is passed from the input DC across capacitor C_IN and energy is stored in inductor L1. When switch Q1 is deactivated by pulse width modulator PWM, diode D3 conducts, transferring the stored energy to capacitor C1. By the action of the first converter stage, an intermediate DC voltage is produced across capacitor C1.

A second (buck) converter stage is coupled to the first converter stage and includes a diode D1, a diode D2, an inductor L2 and a capacitor C_OUT. The second converter stage is a DC/DC converter also controlled by switch Q1. When switch Q1 is activated by pulse width modulator PWM, the voltage across capacitor C1 conducts through diode D1, drawing current through inductor L2, therefore, transferring energy to capacitor C_OUT and storing energy in inductor L2. When switch Q1 is deactivated by pulse width modulator PWM, diode D1 is reverse biased and diode D2 conducts, transferring the stored energy in inductor L1 to capacitor C_OUT. By the action of the second converter stage, an output DC voltage (negative with respect to the common node) is produced across capacitor C_OUT and thus delivered to the load (represented by a resistor R_LOAD).

For the circuit of FIG. 1, filter capacitor C_IN must hold up the voltage at the input of the buck-boost converter stage (i.e., reduce variations of the rectified AC input voltage) so that inductor L1 is always be supplied with sufficient energy to maintain the energy transfer needed to the second converter stage for maintaining the output voltage at C_OUT. There will be no input AC current whenever the rectified AC input voltage is lower than the voltage across the filter capacitor C_IN since the diodes of the bridge BR1 are reverse biased. Therefore, power factor correction cannot be achieved in the circuit of FIG. 1 when capacitor C_IN is utilized to filter the rectified AC input voltage. Capacitor C1 also cannot be used to store energy to achieve power factor correction. In order to achieve average input current of the buck-boost converter stage that is proportional to the rectified AC input voltage, inductor L1 must operate in discontinuous conduction mode (DCM), such that the current through inductor L1 drops to substantially zero before switch S1 turns on again. However, DCM operation of inductor L1 is not possible when the rectified AC input voltage falls below a level defined by the voltage level across capacitor C1 and output voltage and current conditions of the second converter stage. Under the above conditions, the current in inductor L1 reverses direction rather than remaining at zero once the energy stored in inductor L1 has been released. As a result, the buck-boost converter stage cannot transfer energy from the input stage and power factor correction is not to be achieved. The resulting input current is similar to that of an AC bridge rectifier with a peak charging filter capacitor connected to the output of the AC bridge. Therefore, the only energy storage device available without degrading power factor performance is output capacitor C_OUT. However, using capacitor C_OUT to deliver energy to the output during dropouts of the rectified AC input voltage will require a very large capacitor. Low-voltage aluminum electrolytic capacitors are typically employed for this purpose. Such capacitors contribute significantly to the failure rate of power supplies. The large electrolytic capacitors may further add significant cost and undesirably increase the size of the power converter.

While the topology of the circuit of FIG. 1 provides an efficient and low-cost methodology for converting AC input voltages to a DC output as mentioned above, the circuit of FIG. 1 introduces substantial distortion in the AC input current. Therefore, the power supply of FIG. 1 is not useful in applications where high quality AC line rectification is required along with good regulation of the DC output voltage or current.

Figure 2:
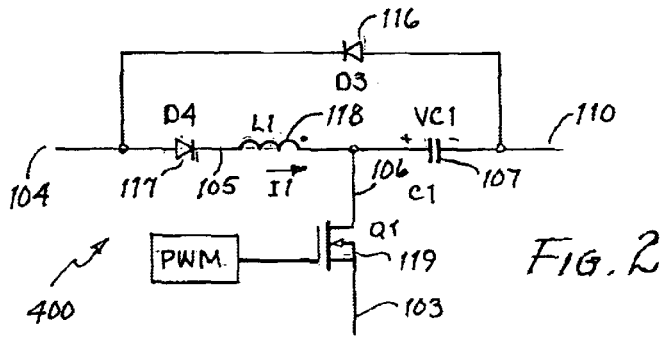
FIG. 2 is a schematic diagram depicting a first converter stage of a power supply circuit in accordance with an embodiment of the present invention.

Referring now to FIG. 2, a schematic diagram of a first buck-boost converter stage 400 of a power supply circuit in accordance with an embodiment of the present invention is shown. An inductor 118 is connected in series with a blocking diode 117 to an input node 104 that receives a positive DC input voltage with respect to a common node 103. The voltage on input node 104 may be substantially DC or a pulsating rectified AC voltage. Inductor 118 is charged by activating switch (transistor) 119, pulling current from inductor 118 by alternately connecting switching node 106 to common node 103. Blocking diode 117 prevents reverse flow of current to input node 104 when the voltage at input node 104 falls below the voltage at switching node, permitting only unidirectional current flow through inductor 118.

When switch 119 is activated, inductor 118 is energized from a zero current to a peak current proportional to the product of the on state period and the instantaneous voltage present at node 104. Simultaneously, capacitor 107 delivers stored energy to output node 110. When switch 119 is deactivated, current flows through a flyback diode 116 and blocking diode 117, causing the energy stored in inductor 118 to transfer to capacitor 107. As the current through inductor 118 decreases, diode 116 becomes reverse-biased. Blocking diode 117 prevents reverse flow of current when the voltage at node 106 exceeds the instantaneous voltage at node 104, as a reverse current would otherwise occur once the inductor 118 current has reached zero. Diode 117 enables first power converter stage 400 to maintain a DC voltage at capacitor 107, while enforcing discontinuous conduction mode in inductor 118. Assuming that the duty ratio of switch 119 is kept constant, average input current into node 104 will be proportional to the instantaneous voltage at node 104 and good power factor performance will be achieved. Capacitor 107 is selected to be sufficiently large in order to maintain a substantially DC voltage at capacitor 107.

First converter stage 400 can operate as a step-down DC voltage converter producing an output voltage across the energy storage capacitor 107 that is lower than the typical hold-up capacitor voltage of prior art single-stage PFC power supplies (higher than 375V typically). The step-down feature of first converter stage 400 permits construction of a single-stage PFC low output voltage AC/DC power supply without the need for a step-down power transformer, while operating at reasonably high duty ratio of switch 119, and with improved overall efficiency.

Accordingly, embodiments of the present invention include first converter stage 400 and variants thereof to provide direct off-line operation with improved power factor and low harmonic distortion of input AC line current in a low output voltage AC/DC converter.

Figure 3:
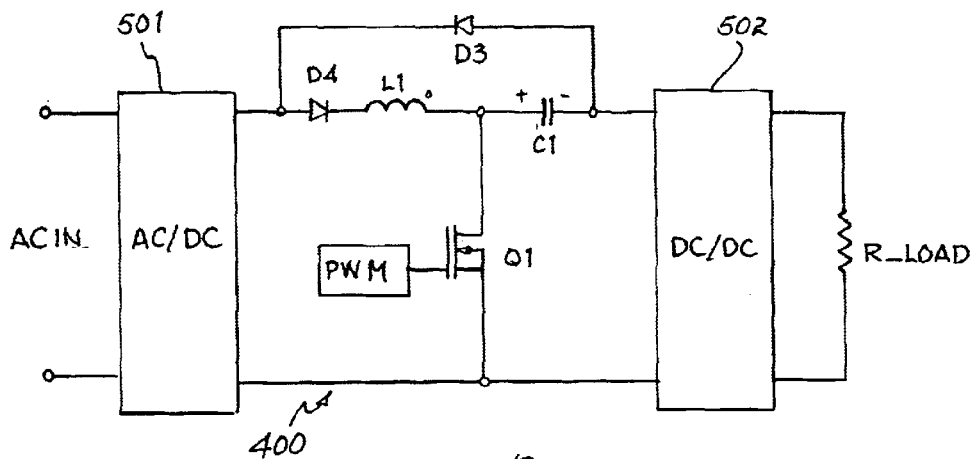
FIG. 3 is a generalized schematic diagram depicting a power supply in accordance with an embodiment of the present invention.

Referring now to FIG. 3, a generalized schematic diagram of a power supply in accordance with an embodiment of the present invention is depicted. An AC/DC rectifier 501 is coupled to a first converter stage 400 in accordance with the schematic of FIG. 2. Rectifier 501 is typically a full-wave bridge rectifier and may include a capacitor for filtering high-frequency switching component of the input current of first converter stage 400.

A DC/DC converter 502 provides a second converter stage for converting the intermediate DC voltage produced by first converter stage 400 to a low voltage DC output. A load, represented by resistor R_LOAD, is connected to the output of second converter stage 502. The power converter circuit of FIG. 3 represents a generic model of a variety of multi-stage converter circuits that can be built using buck-boost stage 400 of FIG. 2. An exemplary set of power converters that may be implemented are illustrated in the following description and associated figures, but the present invention is not limited to the particular embodiments depicted herein.

Figure 4:
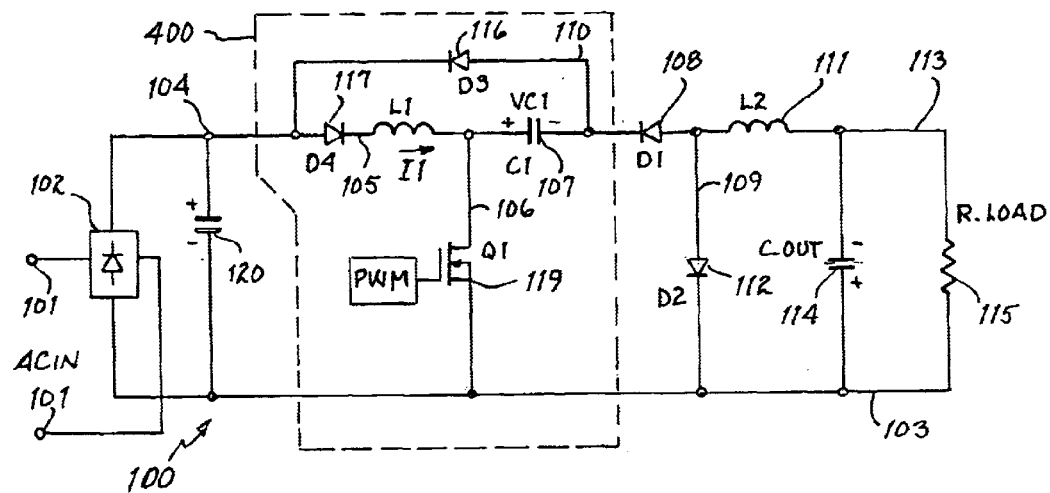
FIG. 4 is a detailed schematic diagram depicting a power supply in accordance with an embodiment of the present invention.

Referring now to FIG. 4, a two-stage power converter including the buck-boost stage 400 of FIG. 2 and a buck output stage is depicted. The buck output stage is coupled to first converter stage 400 by a diode 108 and includes a diode 112, an inductor 111 and a capacitor 114. The second converter stage is controlled along with buck-boost stage 400 by switch 119. When switch 119 is activated by pulse width modulator PWM, the voltage across capacitor 107 appears as a negative bias to diode 108, drawing current through inductor 111. Therefore, energy from capacitor 107 is delivered to capacitor 114 and partially stored in inductor 111. When switch 119 is deactivated by pulse width modulator PWM, diode 108 is reverse biased and diode 112 conducts, transferring the stored energy in inductor 111 to capacitor 114. By the action of the second converter stage, an output DC voltage (negative with respect to the common node) is produced across capacitor 114 and thus delivered to the load (represented by a resistor 115). The power converter of FIG. 4 may be further adapted to provide galvanic isolation by incorporating a transformer in the second DC/DC converter stage.

Figure 5:
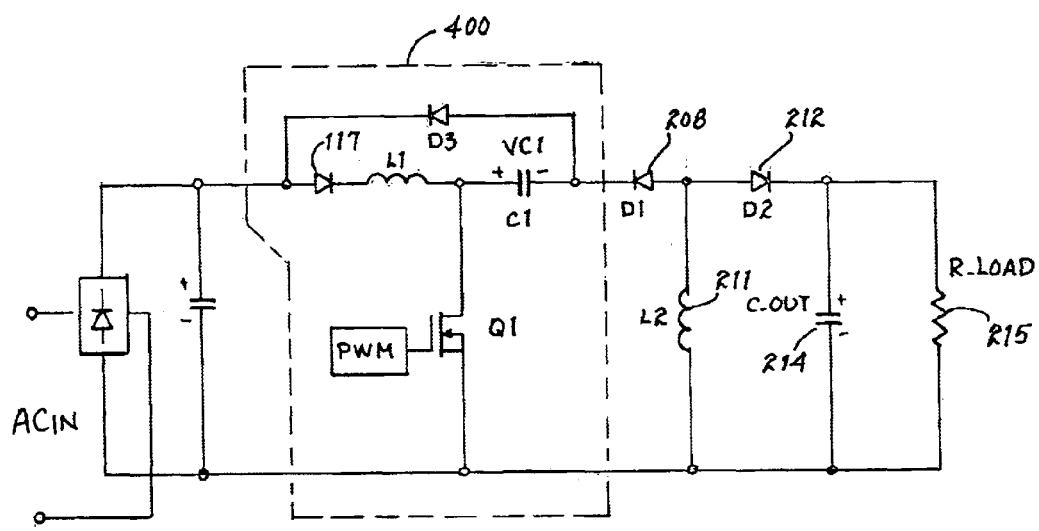
FIG. 5 is a detailed schematic diagram depicting a power supply in accordance with another embodiment of the present invention.
Figure 6:
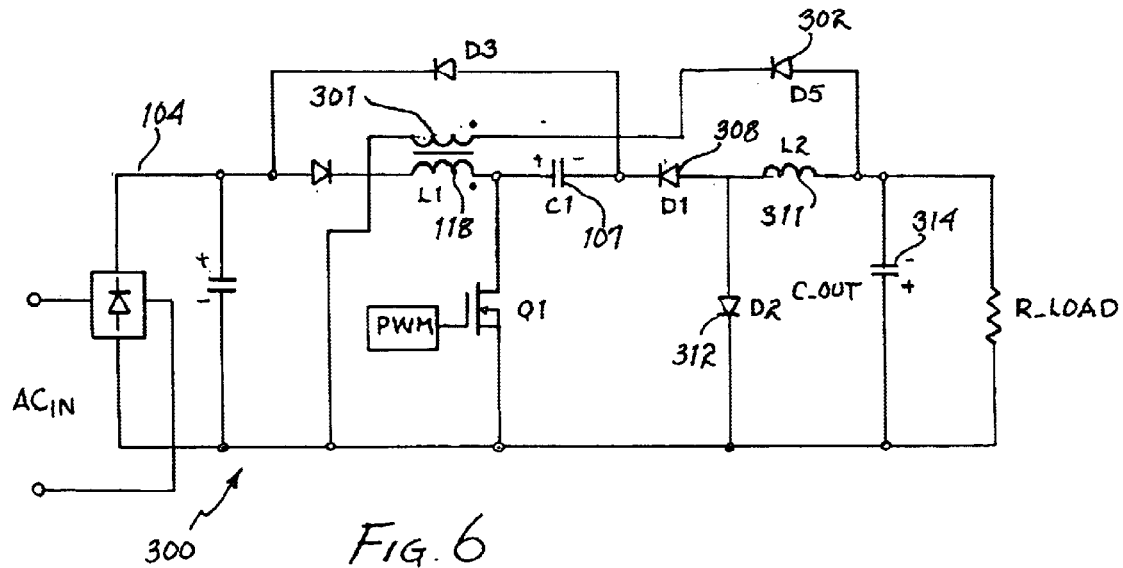
FIG. 6 is a detailed schematic diagram depicting a power supply in accordance with yet another embodiment of the present invention.
Figure 7:
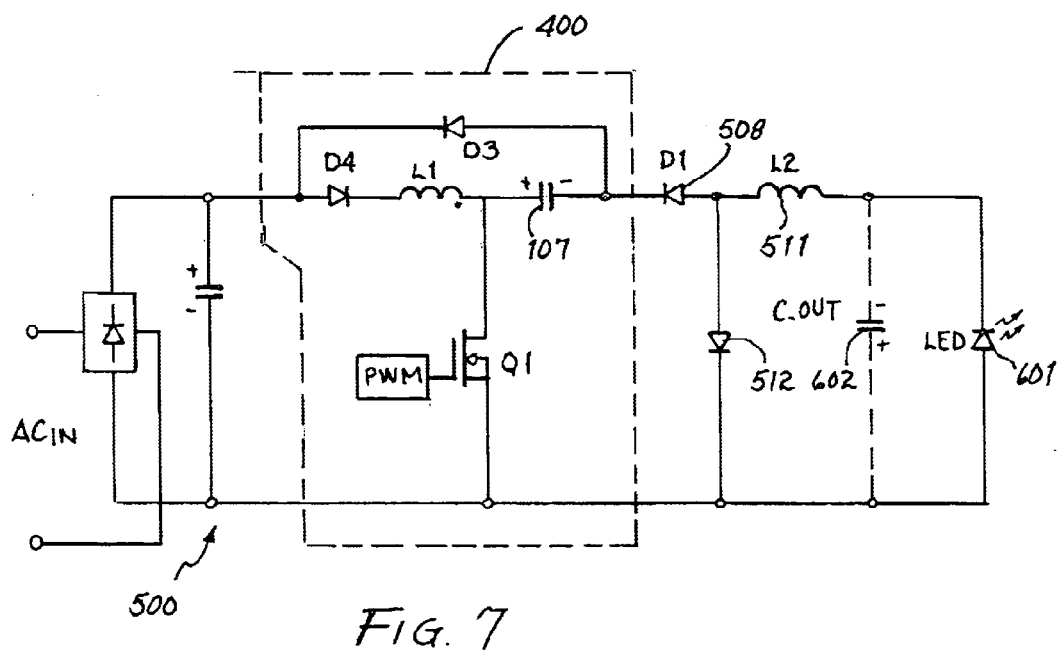
FIG. 7 is a detailed schematic diagram depicting a power supply in accordance with yet another embodiment of the present invention.

The power converters of FIGS. 5–7 are similar to that of FIG. 4, thus only differences appearing therein will be described below. The output stages of the power converters of FIGS. 5–7 differ in form from the power converter of FIG. 4, but all of the output stages are controlled by a switch 119 within first converter stage 400.

Referring now to FIG. 5, a two-stage power converter including the buck-boost stage 400 of FIG. 2 and a second buck-boost output stage is depicted. The buck-boost output stage is coupled to first converter stage 400 by a diode 208 and includes a diode 212, an inductor 211 and a capacitor 214. When the switch (Q1) is activated by pulse width modulator PWM, diode 208 is forward biased and inductor 211 charges as current is passed from the intermediate DC voltage across capacitor 107 and energy is stored in inductor 211. When switch (Q1) is deactivated by pulse width modulator PWM, diode 208 is reverse biased and diode 212 conducts, transferring the stored energy to capacitor 214. By the action of the second converter stage, an output DC voltage (positive with respect to the common node) is produced across capacitor 214 and thus delivered to the load (represented by a resistor 215). The power converter of FIG. 5 may be further adapted to provide galvanic isolation by incorporating a transformer in the second DC/DC converter stage.

Referring next to FIG. 6, a two-stage power converter including the buck-boost stage 400 of FIG. 2 with addition of a secondary winding 301 to inductor 118 coupled to output capacitor 314 by a diode 302. A second buck output stage is depicted in FIG. 6 in the way of example, rather than in the limiting sense, as any of the second stage converter embodiments of this description or other topologies can be used. Operation of the circuit of FIG. 6 is identical to operation of the circuit of FIG. 4, except that when voltage at capacitor 107 exceeds voltage at capacitor 314 multiplied by a turn ratio between windings 118 and 301. One possible reason for voltage increase at capacitor 107 is associated with imbalance of energy transfer between the first converter stage operating in DCM and second converter stage operating in CCM. At light load (high R_LOAD), this imbalance can create high voltage stress at capacitor 107. When voltage at capacitor 107 exceeds voltage at capacitor 314 multiplied by a turn ratio between windings 118 and 301, as the switch (Q1) is deactivated by pulse width modulator PWM, diode 302 becomes forward biased yielding an alternative path for the energy stored in inductor 118 to be transferred directly to output capacitor 314. Therefore, voltage at capacitor 107 will be limited to the voltage at capacitor 314 multiplied by the turn ratio between windings 118 and 301.

Referring finally to FIG. 7, a two-stage power converter including the buck-boost stage 400 of FIG. 2 and a second buck output stage configured as a current source for driving a semiconductor light source 601 is depicted. The buck output stage is coupled to first converter stage 400 by a diode 508 and includes a diode 512, an inductor 511 and a capacitor 602. Operation of the circuit of FIG. 7 is identical to operation of the circuit of FIG. 4, but filter capacitor 602 may be optional or may be a small non-electrolytic capacitor, since constant average current through semiconductor light source 601 will generally be the only control required. The above is especially true if continuous conduction mode with respect to inductor 511 is maintained. The capacitance value of capacitor 107 is selected to set the amount of input AC ripple transferred to the output current of the power converter (i.e., to semiconductor light source 601) and to limit the peak-to-average current ratio to a predetermined level. Capacitance 107 may also be a small non-electrolytic capacitor, yielding a more compact, low cost and reliable power converter. Using a non-electrolytic capacitor for capacitor 107 dramatically increases the service live of the power converter of FIG. 7 and permits operation at elevated ambient temperatures. The power converter of FIG. 7 can also be operated from a phase-controlled power source such as are commonly used for dimming light sources (due to the use of intermediate storage capacitor 107). The above characteristics make the power supply of FIG. 7 ideal for driving semiconductor light sources in applications where one or more semiconductor light sources are used in what were previously incandescent lighting applications, such as traffic control and lighting applications.

The present invention presents a new class of AC/DC power converters that achieve unity power factor and low ripple of output current or voltage by means of an intermediate capacitor as the first storage means within the power converter and a blocking means for preventing discharge of the storage means and permitting input energy to be delivered to the output continuously. The power converters of the present invention have improved input AC line current harmonic distortion and power factor correction when operated directly off of an input AC line voltage. The class of converters presented herein are further ideal for driving semiconductor light sources in applications replacing traditional uses for incandescent or other light sources. In latter applications, the power converters disclosed herein have improved reliability and extended operating temperature range due to lack of electrolytic capacitors altogether.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A power supply circuit comprising:
    a rectifier stage for receiving an AC voltage input and for producing a first substantially DC voltage;
    a direct-coupled first converter stage providing power factor correction and coupled to an output of said rectifier stage for converting said first substantially DC voltage to an intermediate DC voltage lower than a peak value of said first substantially DC voltage, said first converter stage comprising a first inductor coupled in functional series with a first diode, said series coupled circuit connected to said output of said rectifier stage, whereby said first converter stage is prevented from conducting energy into said rectifier when said first DC voltage falls substantially below a threshold; and
    a second converter stage directly coupled to said first converter stage for converting said intermediate DC voltage to an output DC voltage.

2. The power supply circuit of claim 1, wherein said first inductor has a first terminal connected to a first terminal of said first diode, and wherein a second terminal of said first diode is connected to said rectifier.

3. The power supply circuit of claim 2, wherein said first converter stage further comprises:
    a first capacitor having a first terminal connected to a second terminal of said inductor and a second terminal connected to an input of said second converter stage; and
    a switch having a first terminal connected to said first terminal of said first capacitor and a second terminal connected to a common node of said power supply circuit.

4. The power supply circuit of claim 3, wherein said first capacitor is a non-electrolytic capacitor.

5. The power supply circuit of claim 3, wherein said first converter stage further comprises a flyback diode having a first terminal connected to said second terminal of said first capacitor and a second terminal connected to a second terminal of said first diode.

6. The power supply circuit of claim 3, wherein said second converter stage is a passive converter stage controlled by said switch.

7. The power supply circuit of claim 6, wherein said second converter stage is a buck converter stage.

8. The power supply circuit of claim 6, wherein said second converter stage is a buck-boost converter stage.

9. The power supply circuit of claim 6, wherein said second converter stage is a transformer isolated forward converter stage.

10. The power supply circuit of claim 6, wherein said second converter stage is a transformer isolated flyback converter stage.

11. The power supply circuit of claim 6, wherein said second converter stage is a buck converter stage adapted to regulate an output current of said second converter stage.

12. The power supply circuit of claim 6, wherein said second converter stage is a buck-boost converter stage adapted to regulate an output current of said second converter stage.

13. The power supply circuit of claim 1, wherein said rectifier includes one or more capacitors connected between said output of said rectifier stage and a common node of said power supply circuit, wherein all of said one or more capacitors are non-electrolytic capacitors, and wherein all of said one or more capacitors comprise all of the external capacitance connected between said output of said rectifier stage and said common node of said power supply.

14. The power supply circuit of claim 1, wherein said first inductor includes a secondary winding coupled to an output of said second converter stage.

15. The power supply circuit of claim 14, wherein said secondary winding is connected to an output of said second converter stage through a second diode, whereby said secondary winding provides and alternative path for delivery of energy stored in said first inductor to said output of said second converter stage, whereby a voltage stress on a first capacitor within said second converter stage is reduced.

16. The power supply circuit of claim 1, further comprising a semiconductor light source connected to an output of said second converter stage, and wherein said first converter stage and said second converter stage are adapted to supply controlled output current through said semiconductor light source.

17. The power supply circuit of claim 16, wherein said AC voltage input has a phase-controlled characteristic for controlling a brightness of said semiconductor light source.

18. A power supply circuit comprising:
    a rectifier stage for receiving an AC voltage input and for producing a first DC voltage;
    a direct-coupled first converter stage coupled to an output of said rectifier stage for converting said first DC voltage to an intermediate DC voltage lower than a peak value of said first DC voltage, said first converter stage comprising means for preventing reverse flow of current from said first converter stage to said rectifier stage; and
    a second converter stage directly-coupled to said first converter stage for converting said intermediate DC voltage to an output DC voltage.

19. The power supply circuit of claim 18, wherein said first converter stage further comprises primary storage means for storing energy received from said AC voltage input.

20. A method for converting an AC power signal to a DC power output comprising the steps of:
    rectifying said AC power signal to produce an unfiltered rectified power signal;
    switching said unfiltered rectified power signal via a direct-coupled input stage into an intermediate energy storage element to produce an intermediate DC voltage lower than a peak value of said unfiltered rectified power signal;
    blocking said intermediate storage element from reverse conducting to said unfiltered rectified power signal when said unfiltered rectified power signal drops below a threshold voltage; and
    switching said intermediate DC voltage directly into an input of a second converter stage for producing a low voltage DC output.

* * * * *